US012291426B2

(12) United States Patent
Weber et al.

(10) Patent No.: US 12,291,426 B2
(45) Date of Patent: May 6, 2025

(54) ELEVATOR CAR ARRANGEMENT FOR A DOUBLE-DECK ELEVATOR, AND DOUBLE-DECK ELEVATOR

(71) Applicant: Inventio AG, Hergiswil (CH)

(72) Inventors: Stefan Weber, Niederwil AG (CH); Andre Weibel, Ballwil (CH)

(73) Assignee: INVENTIO AG, Hergiswil (CH)

( * ) Notice: Subject to any disclaimer, the term of this patent is extended or adjusted under 35 U.S.C. 154(b) by 19 days.

(21) Appl. No.: 18/551,199

(22) PCT Filed: Mar. 9, 2022

(86) PCT No.: PCT/EP2022/056023

§ 371 (c)(1),
(2) Date: Sep. 19, 2023

(87) PCT Pub. No.: WO2022/200046

PCT Pub. Date: Sep. 29, 2022

(65) Prior Publication Data

US 2024/0300781 A1 Sep. 12, 2024

(30) Foreign Application Priority Data

Mar. 26, 2021 (EP) .................................... 21165085

(51) Int. Cl.
*B66B 11/02* (2006.01)

(52) U.S. Cl.
CPC .................................. *B66B 11/022* (2013.01)

(58) Field of Classification Search
CPC ............. B66B 11/022; B66B 2201/306; B66B 2009/006
See application file for complete search history.

(56) References Cited

U.S. PATENT DOCUMENTS

| | | | | |
|---|---|---|---|---|
| 9,783,391 | B2 * | 10/2017 | Zerelles | B66B 11/022 |
| 2019/0218067 | A1 * | 7/2019 | Schmidt | B66B 11/022 |
| 2020/0239289 | A1 | 7/2020 | Seigneur | |

FOREIGN PATENT DOCUMENTS

| | | | | |
|---|---|---|---|---|
| EP | 2468674 | A1 * | 6/2012 | B66B 11/022 |
| EP | 3514096 | A1 | 7/2019 | |
| WO | WO-0238482 | A1 * | 5/2002 | B66B 11/0206 |
| WO | WO-2007074206 | A1 * | 7/2007 | B66B 11/007 |
| WO | 2015043766 | A1 | 4/2015 | |

* cited by examiner

*Primary Examiner* — Diem M Tran
(74) *Attorney, Agent, or Firm* — William J. Clemens; Shumaker, Loop & Kendrick, LLP

(57) ABSTRACT

An elevator car arrangement for a double-deck elevator has a car frame; a first car coupled to the car frame; a second car arranged on the car frame above or below the first car and coupled to the car frame so as to be movable in a vertical direction relative to the car frame and relative to the first car; a push chain coupled, with a first end of a force absorption section of the push chain, to the first car or to the car frame, and with an opposite, second end of the force absorption section to the second car, and is arranged such that the second car exerts a pressure load on the force absorption section due to gravity; and a drive device coupled to the push chain to displace the second car in the vertical direction relative to the first car by the push chain.

13 Claims, 4 Drawing Sheets

24 FIRST CAR 26 SECOND CAR 30 PUSH CHAIN 40 DRIVE DEVICE
41 FASTENING STRUCTURES 42 FIRST HOLDERS 44 FIRST GUIDE STRUCTURE
70 CONTROL DEVICE

24 FIRST CAR 26 SECOND CAR 30 PUSH CHAIN 40 DRIVE DEVICE
41 FASTENING STRUCTURES 42 FIRST HOLDERS 44 FIRST GUIDE STRUCTURE
70 CONTROL DEVICE

24 FIRST CAR 26 SECOND CAR 30 PUSH CHAIN 40 DRIVE DEVICE
41 FASTENING STRUCTURES 42 FIRST HOLDERS 44 FIRST GUIDE STRUCTURE
70 CONTROL DEVICE

24 FIRST CAR 26 SECOND CAR 30 PUSH CHAIN 40 DRIVE DEVICE
41 FASTENING STRUCTURES 42 FIRST HOLDERS 44 FIRST GUIDE STRUCTURE
70 CONTROL DEVICE

24 FIRST CAR 26 SECOND CAR 30 FIRST PUSH CHAIN 40 FIRST DRIVE DEVICE
42 FIRST HOLDERS 44 FIRST GUIDE STRUCTURE 50 SECOND DRIVE DEVICE
52 SECOND HOLDERS 54 SECOND GUIDE STRUCTURE
60 SECOND PUSH CHAIN 70 CONTROL DEVICE

ELEVATOR CAR ARRANGEMENT FOR A DOUBLE-DECK ELEVATOR, AND DOUBLE-DECK ELEVATOR

FIELD

The invention relates to a car arrangement for a double-deck elevator and to a double-deck elevator having such a car arrangement.

BACKGROUND

Persons, or, in general, loads, can be transported between different floors or height levels in buildings by means of ordinary single-car elevators or by means of double-deck elevators—sometimes also referred to as double-decker elevators. A double-deck elevator is characterized by a car arrangement with a car frame and two cars arranged one above the other. By means of the two cars arranged one above the other, two different floors lying one above the other can be approached simultaneously.

In some buildings, the floors are of different heights, resulting in different vertical distances between the access points to the elevators. So that such floors can be approached without any problem with a double-deck elevator, it has to be possible to adjust the vertical distance between the two cars of a double-deck elevator to the corresponding floor heights and corresponding distances of the access points. To adjust this vertical distance, at least one of the two cars is displaceable in the vertical direction relative to the other car, and, in general, relative to the car frame. This vertical displacement takes place by means of a displacement device.

The displacement device can have, for example, one or more screw spindle drives and/or scissor-like connecting elements via which the two cars are connected to one another. Such a spindle drive has at least one spindle and a toothed rack in which the spindle engages. The spindle can be arranged on the car frame of the car arrangement or on the car to be moved. The toothed rack can accordingly be arranged on the car to be moved, or the elevator car frame. In the case of a rotation of the spindle generated by means of a drive device, the distance between the cars changes. As an alternative to the spindle drive, a hydraulic displacement device for displacing the car can be provided. The distance between the cars can be adjusted during travel by means of a controller to the floor distance between the two floors to be approached and the corresponding distance of the accesses.

EP 3 514 096 A1 describes a double-deck elevator with two cars, wherein a vertical distance between the cars can be set by means of a tension chain and several deflecting elements. The corresponding drive device increases the height of the corresponding car arrangement.

US 2020/0 239 289 A1 describes a push chain in which chain links of the push chain positively engage with one another under pressure loading such that a force absorption section of the push chain is stable under the pressure load in a direction in which the chain links can be pivoted relative to one another when there is no pressure load.

WO 2015/043766 A1 describes an elevator with two cars, which can be displaced independently of one another in an elevator shaft by means of a drive. The cars can be temporarily coupled to one another by means of a mechanical coupling element—for example, in the form of a support chain. The distance between the coupled cars is set by means of the drives assigned to the cars.

When designing an elevator system, the size of the elevator shaft, and in particular its cross-sectional area (footprint), plays a fundamentally important role. In order not to have to additionally enlarge the elevator shaft, the displacement device should have the smallest possible space requirement—in particular, in the horizontal direction. However, both aforementioned displacement devices have a relatively large space requirement—specifically, in the horizontal and vertical directions—wherein in particular the space available in an elevator shaft in the horizontal direction is generally very limited. In addition, the hydraulic displacement device can have a tendency to produce an odor due to the oil used therein, wherein the odor may be perceived as unpleasant in the corresponding car.

One of the challenges in the design of such double-deck elevators is to make components for displacing and driving a car to be moved as light, space-saving, and cost-efficient as possible.

SUMMARY

There may be a need, inter alia, for an elevator car arrangement for a double-deck elevator which makes it possible to adjust the distance between an upper car and a lower car using a particularly compact and lighter displacement and drive means. Furthermore, there may be a need for a corresponding double-deck elevator.

A need of this kind can be satisfied by the subject matter according to one of the advantageous embodiments defined in the following description.

A first aspect of the invention relates to an elevator car arrangement for a double-deck elevator. The car arrangement has a car frame, a first car, a second car, a push chain, and a drive device. The first car is coupled to the car frame. The second car is arranged on the elevator car frame above or below the first car. The second car is coupled to the car frame in such a way that it is movable, relative to the car frame and relative to the first car, in the vertical direction. The push chain is coupled, with a first end of a force absorption section of the push chain, to the first car or the elevator car frame. Furthermore, the push chain is coupled, with an opposite, second end of the force absorption section, to the second car. The push chain is arranged such that the second car exerts a pressure load on the force absorption section of the push chain due to gravity. The drive device is coupled to the push chain and is designed to displace the second car in the vertical direction, relative to the first car, by means of the push chain.

Thus, by means of the push chain and the drive device, the second car, which is arranged to be movable in the vertical direction in the elevator car frame above or below the first car, can be displaced in the vertical direction relative to the first car, so that the vertical distance between the cars is adjustable—in particular, as a function of corresponding accesses to the cars in different floors of a building. The adjustment of the vertical distance takes place in particular by means of a change in a length of the force absorption section, wherein this length takes place through a movement of the push chain by means of the drive device.

Possible features and advantages of embodiments of the invention can be regarded, inter alia and without limiting the invention, as being based upon the concepts and findings described below.

An elevator car can generally be understood as a frame that can be moved between multiple levels or floors, e.g., in an elevator shaft, with at least one car, or with at least two cars in the present case of a double-deck elevator, for transporting people or loads. The elevator car frame can in particular be a frame-like construction for carrying the cars, and is also referred to as a catch frame, among other things. The elevator car frame can be guided, for example, along at least one guide rail extending in an elevator shaft. Such guide rails can be arranged on one side or on two opposite sides in the elevator shaft. A catch device can also be integrated into the elevator car frame, which serves to brake the elevator car frame in case of excess speed.

In the case of a double-deck elevator, the elevator car frame can comprise the two cars, arranged in double-decked fashion, for approaching the two different floors at the same time. As indicated at the outset, it may be necessary to adjust the vertical distance between the two cars of the double-deck elevator due to unequal floor distances between the different floors. For this purpose, a displacement device can be arranged by means of which at least one of the two cars can be displaced in the vertical direction relative to the other car, and, in general, relative to the elevator car frame. The aforementioned drive device and the push chain form such a displacement device. In particular, in the approach presented here, it is proposed that the displacement of the second car be realized by means of the push chain. The vertical distance between the cars is here determined by the length of the force absorption section of the push chain. This length can be adjusted by means of the drive unit, whereby the second car is displaced relative to the first car. As a rule, a guide structure within the car frame in which the two cars are arranged one above the other is additionally arranged, in order to guide the car to be moved during its movement.

The weight of the second car loads the push chain. The second car can stand, so to speak, on the push chain. The section of the push chain which the weight force loads and which accordingly carries the weight of the second car is the force absorption section. For the length of the force absorption section to be changeable, the push chain must be longer than the force absorption section. The section of the push chain which the weight of the second car does not load can be referred to as the residual section of the push chain. The length of the residual section changes as a function of the length of the force absorption section. In particular, the length of the residual section increases, and the length of the force absorption section decreases, and vice versa. The push chain has butting characteristics during the lifting of the second car. Therefore, the push chain cannot tear. In addition, the push chain and the drive device driving it have only a relatively small space requirement—in particular, in the horizontal direction—compared to the spindle drive and the hydraulic displacement device.

The drive device can generally be understood as a motor, by which the push chain is moved in such a way that the length of the force absorption section of the chain changes, so that the corresponding car, e.g., the second car, can be raised and/or lowered relative to the car frame and the first car.

According to one embodiment, the push chain can be designed in such a way that chain links of the push chain engage positively with one another under a pressure load such that the force absorption section of the push chain is stable under the pressure load in a direction in which chain links of the push chain are pivotable against one another when there is no pressure load.

In other words, the push chain can always be stable in a first lateral direction, which is perpendicular to a longitudinal direction of the push chain when the push chain is unrolled, and can be unstable, in particular pivotable, and in particular bendable, at the transition of the chain links, in a second lateral direction, which, in the case of an unloaded and/or unrolled push chain, is perpendicular to the longitudinal direction of the push chain and perpendicular to the first lateral direction. In contrast to this, the chain links of the push chain can interlock in a positive manner under the pressure load such that the push chain is stable in the second lateral direction. The push chain can thus hold high pressure loads.

According to one embodiment, the drive device can be designed and thus coupled to the push chain such that, when the second car is displaced in the direction of gravity, the push chain drives the drive device in the manner of a generator.

In other words, the potential energy stored in the raised second car can be converted into electrical energy by means of the push chain and the drive device in the generator operating mode. The weight of the second car here acts upon the push chain, which drives the drive device, which in turn acts as a generator and generates the electrical energy. The electrical energy can be stored and can be reused—for example, the next time the second car is moved—to supply the drive device with energy.

According to one embodiment, the drive device can have the motor and an output which is arranged on a shaft of the motor, and is in engagement with the push chain. The output can be formed, for example, by a gear wheel, the teeth of which engage in the chain links of the push chain. The drive device can further comprise a housing and/or a guide for the residual section, and, optionally, a part of the force absorption section of the push chain. The motor and/or the residual section may optionally be arranged in or on the housing.

According to one embodiment, the drive device can be arranged at the first car or at the second car, if the push chain is coupled to the first car. Alternatively, the drive device can be arranged on the elevator car frame or on the second car if the push chain is coupled to the elevator car frame. Thus, the drive device can engage in the push chain at the first end of the force absorption section or at the second end of the force absorption section.

According to one embodiment, the push chain can be arranged such that the residual section of the push chain, which is not the force absorption section, is arranged between the cars. This is particularly advantageous when the push chain is coupled to the first car. For example, the residual section, if the push chain is coupled to the first car, can be guided along the car on which the drive device is arranged.

According to one embodiment, the push chain can be arranged such that the residual section of the push chain extends at least partially in the horizontal direction. This can contribute to making the vertical space requirement of the displacement apparatus particularly low.

According to one embodiment, if the push chain is coupled to the first car, the first car can have a first force absorption area, or, if the push chain is coupled to the car frame, the car frame can have the first force absorption area. The second car can have a second force absorption area. The push chain can be coupled to the first force absorption area with the first end of the force absorption section and to the second force absorption area with the second end of the force absorption section. The force absorption section can extend from the first force absorption area to the second force absorption area. A vertical distance between the two cars is dependent upon a length of the force absorption section. The drive device can be designed, in order to displace the second car in the vertical direction, to move the push chain in such a way that the length of the force absorption section changes.

The second force absorption area is the area at which the weight of the second car is transmitted to the force absorption section of the push chain. The first force absorption area is the area at which the corresponding pressure load is transmitted from the force absorption section to the first car or the elevator car frame. The drive device can be arranged at the first end or at the second end of the force absorption section. The drive device, e.g., its output, can form the corresponding force absorption area at the end of the force absorption section at which the drive device is arranged. Alternatively, a rotatable deflecting device, e.g., a gear wheel, which is in engagement with the push chain, can be arranged at the first end or at the second end of the force absorption section. In this case, the deflecting device can form the corresponding force absorption area.

According to one embodiment, the first car can be coupled to the elevator car frame such that it is arranged to be movable, relative to the elevator car frame, in the vertical direction. The car arrangement can have a further push chain which is coupled to the first car and the elevator car frame. The elevator car arrangement can have a further drive device which is coupled to the further push chain. The further drive device can be designed to displace the first car in the vertical direction relative to the elevator car frame by means of the further push chain.

In other words, both cars can be displaced in the vertical direction relative to the car frame, wherein the further push chain can be arranged for displacing the first car. In this context, the further push chain for displacing the first car can be referred to as the first push chain, and the push chain for displacing the second car can be referred to as a second push chain. The displacement of the first car in addition to the displacement of the second car enables a larger amount of play and/or a greater speed with respect to the adjustment of the vertical distance between the cars as a function of the different floor heights.

According to one embodiment, for the vertical displacement of the second car, the car arrangement can have exactly one single push chain. Alternatively, two or more push chains, e.g., four push chains, can be arranged in each case for displacing the second car and/or the first car. In the case of two or more push chains for displacing the corresponding car, the drive devices for adjusting the corresponding push chains must be synchronized with one another in order to avoid tilting and/or canting of the corresponding car. By contrast, the arrangement of only one single push chain for displacing the second car makes it possible to dispense with this synchronization. This contributes to making it possible for the car arrangement to be produced particularly easily and at low cost, in the case of only one single push chain.

In the case of several push chains per car, the push chains can act upon two, diametrically-opposite corner sections of the corresponding car. For example, a second force absorption area can be arranged on the diametrically-opposite corner sections of the second car. Two diametrically-opposite corner sections can be understood to mean two corner sections of the corresponding car, each of which lies on a diagonal of an underside of the corresponding car. A lifting force can be understood to mean a force for raising and/or lowering the corresponding car. This embodiment can minimize twisting of the corresponding car due to loads during displacement.

According to one embodiment, the push chain can be fastened to the second car in alignment with the center of gravity of the second car. In other words, the push chain can engage directly below the center of gravity of the second car. This is particularly advantageous if only a single push chain is arranged for displacing the second car. In particular, this can contribute to avoiding the tilting and/or canting of the second car.

A second aspect of the invention relates to the double-deck elevator. The double-deck elevator has the car arrangement explained above and a control device configured to control the drive device of the car arrangement as a function of the floor distance between a first floor and a second floor, such that, in a stop position of the car arrangement, the first car is accessible via the first floor, and the second car is accessible via the second floor. Information about the distances between the floors of the corresponding building and/or the corresponding accesses can, for example, be stored on a memory unit of the control device—for example, in the form of a look-up table in which the floors with their distances are assigned to corresponding actuating signals for the drive device.

Embodiments of the invention will be described below with reference to the accompanying drawings, wherein neither the drawings nor the description are intended to be interpreted as limiting the invention.

The drawings are merely schematic, and not to scale. In the different figures, identical reference signs denote identical or similar features.

DETAILED DESCRIPTION

Figure 1:
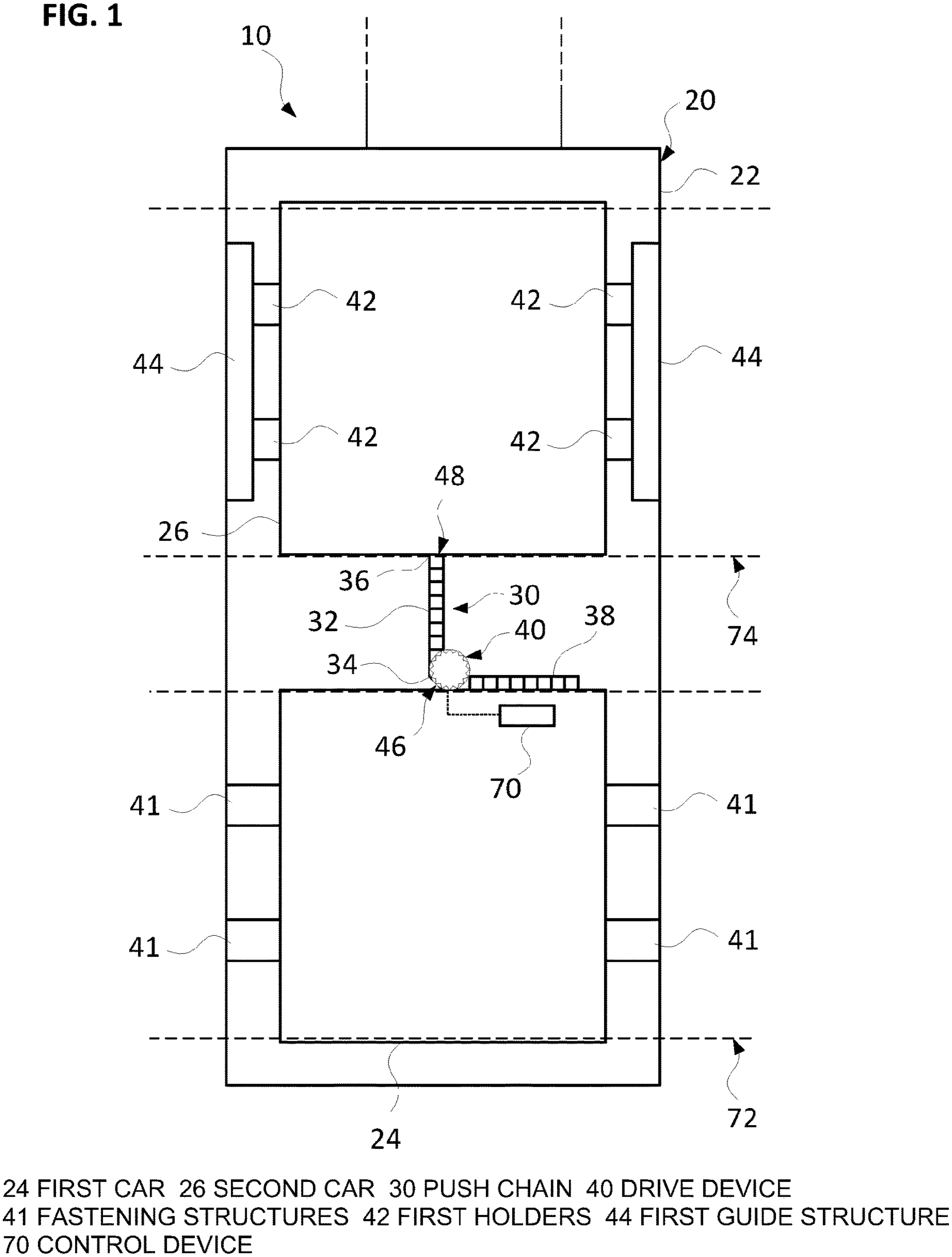
FIG. 1 shows an embodiment of an elevator car arrangement for a double-deck elevator.

FIG. 1 shows an embodiment of an elevator car arrangement 20 for a double-deck elevator 10. The car arrangement 20 has a car frame 22, a first car 24, a second car 26, a push chain 30, and a drive device 40. The cars 24, 26 are arranged one above the other in the elevator car frame 22 in the vertical direction. For example, in the embodiment shown in FIG. 1, the first car 24 is arranged below the second car 26.

When the elevator car arrangement 20 is used as intended in an elevator shaft of a building, the first car 24 is accessible via a first access in a first floor 72, and the second car 26 is accessible via a second access in a second floor 74. A vertical distance between the cars 24, 26 can be set by means of a control device 70. Further components of the double-deck elevator 10, such as a drive device for vertical displacement of the entire car arrangement 20, a counterweight, floor doors, or the like, are not shown for reasons of clarity.

The push chain 30 has a force absorption section 32, a first end 34 of the force absorption section 32 and a second end 36 of the force absorption section 32 opposite the first end 34, and a residual section 38. The push chain 30 can also be referred to as first push chain 30. The force absorption section 32 can also be referred to as first force absorption section 32.

The push chain 30 has several connected chain links. In the case of a pressure load, the chain links engage with one another in a positive manner in such a way that the force absorption section 32 is stable under the pressure load in a direction in which chain links of the push chain 30 can be pivoted against one another when there is no pressure load.

Thus, the chain links in the unloaded state are pivotable relative to one another in a first lateral direction and are stable in directions perpendicular to the first lateral direction—in particular, in a second lateral direction and a longitudinal direction of the push chain 30. By contrast, under the pressure load of the push chain 30, the chain links engage positively with one another, so that the push chain 30 in the region of the force absorption section 32 is also stable in the first lateral direction.

The residual section 38 of the push chain 30 is arranged between the two cars 24, 26. In particular, the residual section 38 is arranged to be substantially horizontal. The residual section 38 can rest, for example, on an upper side of the first car 24. The residual section 38 is not loaded with pressure.

The drive device 40 is coupled to the first car 24 and the push chain 32. The drive device 40 can also be referred to as first drive device 40. The drive device 40 has a motor and an output which is coupled to the push chain. The output is, for example, a gear wheel which engages in the chain links of the push chain 30. The motor can be an electric motor, for example. Optionally, the drive device 40 has a housing. If necessary, the motor and/or the output can be arranged in or on the housing. Furthermore, a part of the force absorption section 32 and/or the residual section 38 can be arranged in the housing and/or be guided in the housing. In the exemplary embodiment shown in FIG. 1, the drive device 40 is arranged on the first car 24. Alternatively, the drive device 40 can be arranged on the second car 26.

The first car 24 has several fastening structures 41, via which it is fixedly coupled to the elevator car frame 22. In other words, in the exemplary embodiment shown in FIG. 1, the first car 24 is fixed relative to the elevator car frame 22 by means of the fastening structures 41. The second car 26 has first holders 42, which are fixedly connected to the rest of the second car 26. The second car 26 is coupled, via the first holders 42, with a first guide structure 44, which is arranged on the elevator car frame 22, in such a way that the second car 26 and in particular the first holders 42 can be moved in the vertical direction relative to the elevator car frame 22.

The weight of the second car 26 acts upon the push chain 30. In other words, the second car 26 is situated on the push chain 30. Due to the weight force of the second car 26, the second car 26 exerts a pressure load on the push chain 30, and in particular on the force absorption section 32. Due to this pressure load, the force absorption section 32 is stable in all directions, and in particular in the first lateral direction. The pressure load is transmitted from the force absorption section 32 at the first end 34 to a first force absorption area 46. In the exemplary embodiment shown in FIG. 1, the drive device 40, and in particular the output of the drive device 40, has the first force absorption area 46. The weight of the second car 26 is transmitted to the push chain 30 at the second end 36 of the push chain 30 in a second force absorption area 48. In the exemplary embodiment shown in FIG. 1, a floor of the second car 26 has the second force absorption area 48.

If a vertical distance between the first car 24 and the second car 26 does not match the vertical distance between the first access in the first floor and the second access in the second floor, the second car 26 can be displaced in the vertical direction relative to the first car 24 by means of the drive device 40 and the push chain 30. In this case, the drive device 40 can drive the push chain 30 such that the length of the force absorption section 32 changes, as a result of which the vertical position of the second car 26 relative to the first car 24 changes. For example, the second car 26 can be pushed upwards or lowered downwards relative to the elevator car frame 22 by means of the push chain 30. For this purpose, the drive device 40 can have a control device or be coupled thereto, wherein the control device is configured to control the drive device 40 as a function of the vertical distance between the accesses of the corresponding floors. The control can here take place by means of corresponding actuating signals.

Optionally, the drive device 40 can be designed such that, when the second car 26 is lowered relative to the elevator car frame 22, the drive device 40 is driven in the manner of a generator by the push chain 30 and generates electrical energy. In other words, when the second car 26 is displaced from top to bottom, the potential energy released during this can be converted into electrical energy by means of the push chain 30 and the drive device 40 in the generator mode. The electrical energy can be temporarily stored in an energy storage device (not shown in the figures) and can be reused at a later point in time—for example, for lifting the second car 26.

In the exemplary embodiment shown in FIG. 1, exactly one single push chain 30 is arranged. This single push chain 30 can, for example, be fastened to the second car 26 in alignment with the center of gravity of the second car 26. Alternatively, two or more push chains, e.g., four push chains, can be arranged for displacing the second car 26. In the case of several push chains, the push chains can act on two, diametrically-opposite corner sections of the floor of the second car 26. For example, corresponding second force absorption areas 48 can be arranged on the diametrically-opposite corner sections of the second car 26.

Figure 2:
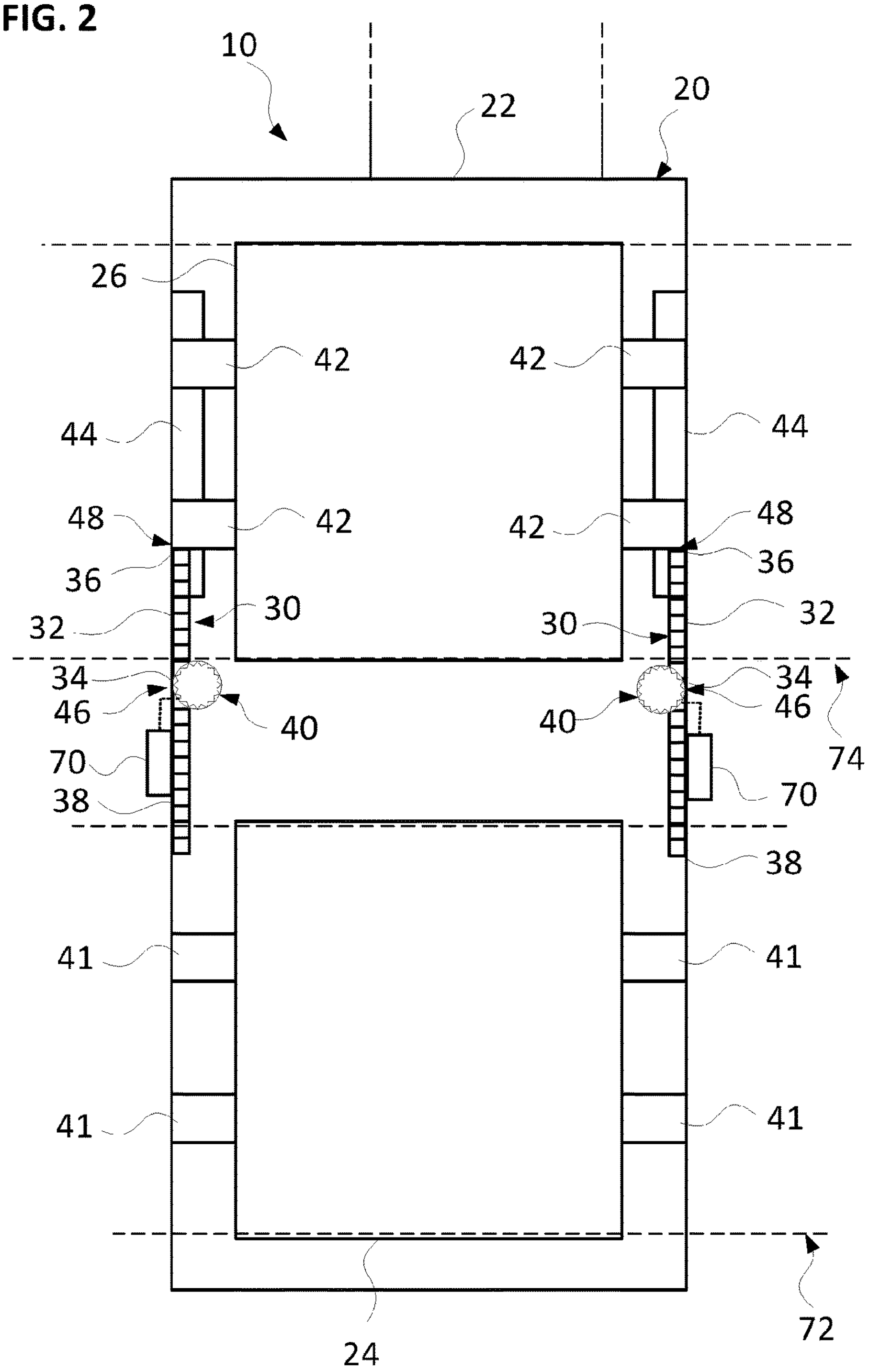
FIG. 2 shows another embodiment of an elevator car arrangement for a double-deck elevator.

FIG. 2 shows an embodiment of a car arrangement 20 which corresponds largely to the embodiment shown in FIG. 1. Therefore, in order to avoid repetitions, only the differences between the embodiment shown in FIG. 2 and the embodiment shown in FIG. 1 will be discussed below.

The elevator car arrangement 20 has two push chains 30 and two drive devices 40. Alternatively, the car arrangement 20 can have more than two push chains 30 and corresponding drive devices 40. The push chains 30 are coupled, at their respective first end 34, to the first force absorption area 46 and, at their respective second end 36, to the second force absorption area 48—for example, via the first holders 42. The first force absorption area 46 is arranged on the elevator car frame 22, and the second force absorption area 48 is arranged on the second car 26, and in particular on the first holders 42. In the exemplary embodiment shown in FIG. 2, the drive devices 40 are arranged on the elevator car frame 22. In this case, the drive devices 40 have the corresponding first force absorption areas 46. Alternatively, the drive devices 40 can be arranged on the second car 26—for example, on the first holders 42. In this case, the drive devices 40 have the corresponding second force absorption areas 48.

Figure 3:
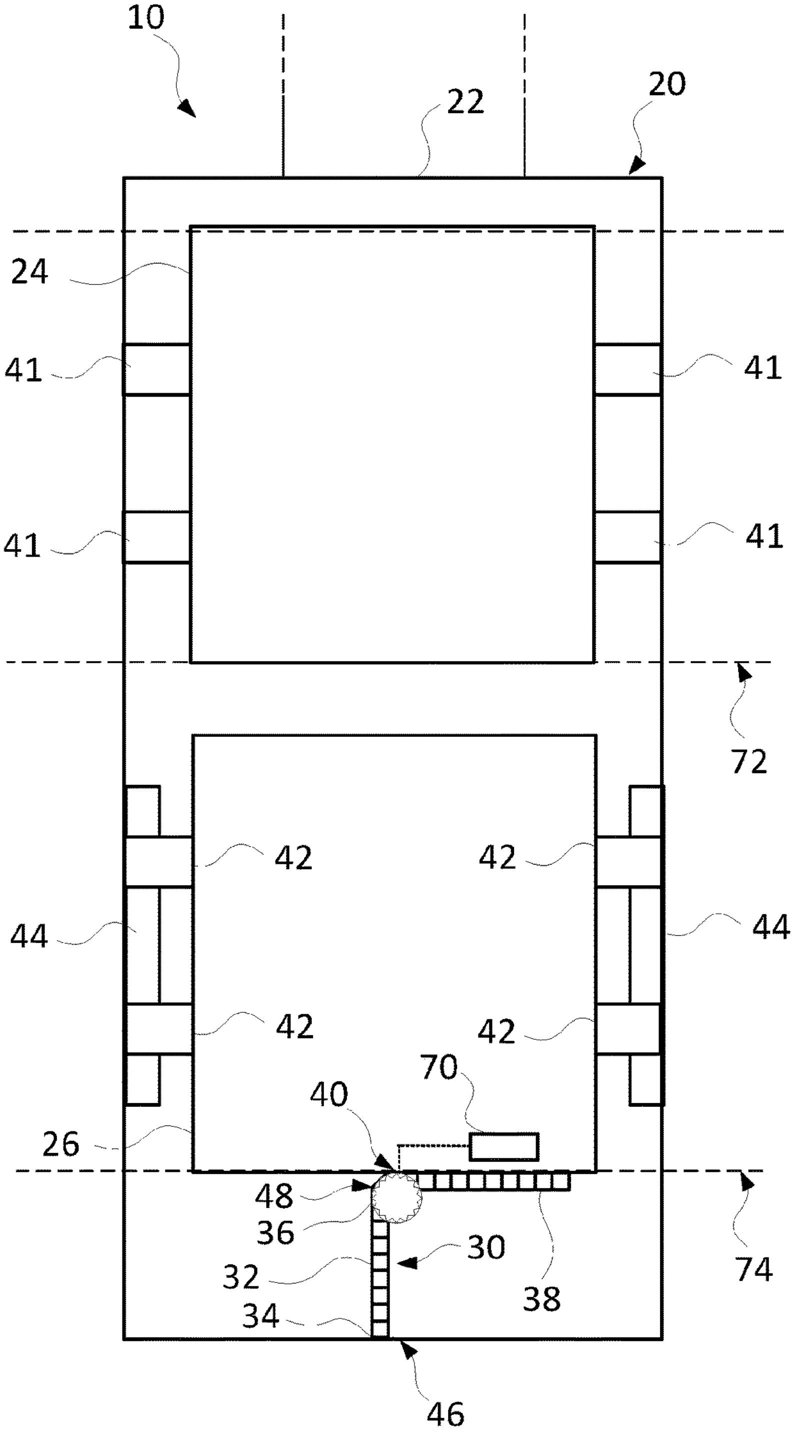
FIG. 3 shows a third embodiment of an elevator car arrangement for a double-deck elevator.

FIG. 3 shows an embodiment of a car arrangement 20, which largely corresponds to one of the embodiments explained above. Therefore, in order to avoid repetitions, only the differences between the embodiment shown in FIG. 3 and the embodiments explained above will be discussed below.

The first car 24, which is fixed with respect to the car frame 22, is arranged above the second car 26. The push chain 30 and the drive device 40 are arranged, in the vertical direction, between the elevator car frame 22 and the second car 26. The first force absorption area 46 is arranged on the elevator car frame 22, and the second force absorption area 48 is arranged on the second car 26. The drive device 40 is arranged on the second car 26 and has the second force absorption area 48. Alternatively, the drive device 40 can be arranged on the elevator car frame 22 and have the first force absorption area 46. The residual section 38 is guided in the horizontal direction along the second car 26—for example, in the housing of the drive device 40 (not shown in the figures).

In the exemplary embodiment shown in FIG. 3, only a single push chain 30 with a corresponding drive device 40 is arranged. Alternatively, two or more push chains 30 and corresponding drive devices 40 can be arranged in the vertical direction between the second car 26 and the elevator car frame 22. In addition, the second force absorption area 48 is arranged on an underside of the second car 26. Alternatively, the second force absorption area or areas 48 can be arranged on the first holders 42.

Figure 4:
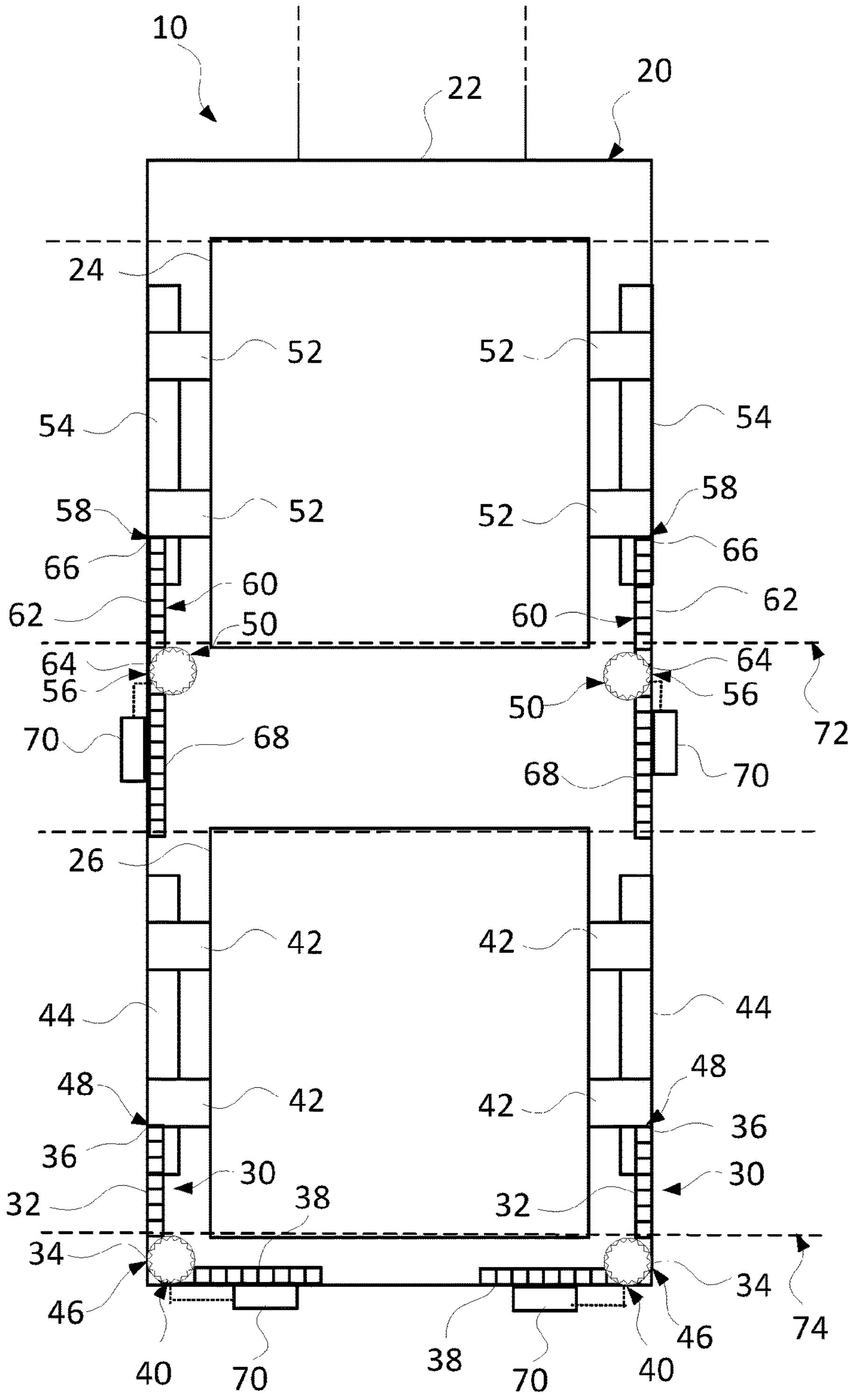
FIG. 4 shows a fourth embodiment of an elevator car arrangement for a double-deck elevator.

FIG. 4 shows an embodiment of an elevator car arrangement 20 that largely corresponds to one of the embodiments explained above. Therefore, in order to avoid repetitions, only the differences between the embodiment shown in FIG. 4 and the embodiments explained above will be discussed below.

The first car 24 is arranged above the second car 26 and is coupled to the elevator car frame 22 in such a way that the first car 24 can be displaced in the vertical direction relative to the second car 26 and relative to the elevator car frame 22. The first car 24 has second holders 52 which are fixedly connected to the rest of the first car 24. The first car 24 is coupled via the second holders 52 to a second guide structure 54, which is arranged on the elevator car frame 22, in such a way that the first car 24 can be moved in the vertical direction relative to the elevator car frame 22.

Two further push chains and two corresponding further drive devices are arranged for the vertical displacement of the first car 24. In this context, the push chains 30 and drive devices 40 for vertically displacing the second car 26 can be referred to as first push chains 30 or first drive devices 40, and the further push chains and further drive devices for vertical displacement of the first car 24 can be referred to as second push chains 60 or second drive devices 50.

The second push chains 60 each include a second force absorption section 62 that engages a respective third force absorption area 56 at a respective first end 64 of the corresponding second force absorption section 62, and engages a respective fourth force absorption area 58 at a respective second end 66 of the corresponding second force absorption section 62. The fourth force absorption areas 58 are arranged on the first car 24—in particular, on the second holders 52. Alternatively, the fourth force absorption areas 58 can each be arranged on an underside of the first car 24. Furthermore, the third force absorption areas 56 can be arranged on the second car 26, e.g., on an upper side of the second car 26—for example, such that the second push chains 60 and/or the second drive devices 50 are arranged, in the vertical direction, between the first car 24 and the second car 26.

The second drive devices 50 are arranged on the elevator car frame 22 and have the third force absorption areas 56. Alternatively, the second drive devices 50 can be arranged on the first car 24 and have the fourth force absorption areas 58.

As an alternative to the exemplary embodiment shown in FIG. 4, only one second push chain 60 and only one second drive device 50, or more than two second push chains 60 and, correspondingly, more second drive devices 50, can be arranged for the vertical displacement of the first car 24.

The weight of the first car 24 acts upon the second push chains 60. In other words, the first car 26 is situated on the second push chains 60. Due to the weight of the first car 24, the first car 24 exerts a pressure load on the second push chains 60, and in particular on the second force absorption sections 62. Due to the pressure load, the second force absorption sections 62 are stable in all directions, and in particular in the first lateral direction. The pressure load is transmitted from the second force absorption sections 62 on the first ends 64 of the second force absorption sections 62 onto the third force absorption areas 56.

The invention is not limited to the described exemplary embodiments. For example, the exemplary embodiments indicated can be combined with one another. For example, in the exemplary embodiment shown in FIG. 1, similar to the exemplary embodiment shown in FIG. 2, two or more push chains 30 and drive devices 40 can be arranged between the first car 24 and the second car 26. Alternatively or additionally, in the exemplary embodiment shown in FIG. 1, the drive device 40 can be arranged on the underside of the second car.

Finally, it should be noted that terms such as "comprising," "having," etc., do not exclude other elements or steps, and terms such as "a" or "an" do not exclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator car arrangement for a double-deck elevator, the car arrangement comprising:
- an elevator car frame;
- a first car coupled to the car frame;
- a second car arranged on the car frame above or below the first car and coupled to the car frame, the second car being movable in a vertical direction relative to the car frame and relative to the first car;
- a push chain having a force absorption section with a first end and an opposite second end, the first end being coupled to the first car or to the car frame and the second end being coupled to the second car, wherein the second car exerts a pressure load on the force absorption section due to gravity; and
- a drive device coupled to the push chain, the drive device displacing the second car in the vertical direction relative to the first car through the push chain.

2. The elevator car arrangement according to claim 1 wherein the push chain includes chain links that engage in one another under the pressure load such that the force absorption section is stable under the pressure load in a direction in which chain links of the push chain are pivotable relative to one another when no pressure load exerted on the force absorption section.

3. The elevator car arrangement according to claim 1 wherein the drive device is driven as a generator by the push chain when the second car is displaced by gravity.

4. The elevator car arrangement according to claim 1 wherein the drive device includes a motor and an output arranged on a shaft of the motor and in engagement with the push chain.

5. The elevator car arrangement according to claim 1 wherein the drive device is arranged on the second car, or the drive device is arranged on the first car and the push chain is coupled to the first car, or the drive device is arranged on the elevator car frame and the push chain is coupled to the elevator car frame.

6. The elevator car arrangement according to claim 1 wherein the push chain includes a residual section that is not part of the force absorption section and is arranged between the first car and the second car.

7. The elevator car arrangement according to claim 6 wherein the residual section extends at least partially in a horizontal direction transverse to the vertical direction.

8. The elevator car arrangement according to claim 1 wherein:

the first car has a first force absorption area when the push chain is coupled to the first car, and the car frame has the first force absorption area when the push chain is coupled to the car frame;

the second car has a second force absorption area;

the push chain is coupled by the first end of the force absorption section to the first force absorption area and is coupled by the second end of the force absorption section to the second force absorption area, whereby the force absorption section extends from the first force absorption area to the second force absorption area;

a maximum vertical distance between the first car and the second car is determined by a length of the force absorption section; and the drive device displaces the second car in the vertical direction by moving the push chain such that the length of the force absorption section changes.

9. The elevator car arrangement according to claim 1 wherein:

the first cabin car is movable, relative to the car frame, in the vertical direction;

a further push chain coupled to the first car and to the car frame;

a further drive device coupled to the further push chain; and the further drive device displacing the first car in the vertical direction relative to the elevator car frame through the further push chain.

10. The elevator car arrangement according to claim 1 wherein the push chain is a single push chain for the displacement of the second car in the vertical direction.

11. The elevator car arrangement according to claim 10 wherein the push chain is fastened to the second car in alignment with a center of gravity of the second car.

12. A double-deck elevator comprising:

the elevator car arrangement according to claim 1; and a control device adapted to control the drive device based on a floor distance between a first floor and a second floor such that, in a stop position of the elevator car arrangement, the first car is accessible via the first floor and the second car is accessible via the second floor.

13. An elevator car arrangement for a double-deck elevator, the car arrangement comprising:

an elevator car frame;

a first car coupled to the car frame;

a second car arranged on the car frame above or below the first car and coupled to the car frame, the second car being movable in a vertical direction relative to the car frame and relative to the first car;

a push chain having a force absorption section with a first end and an opposite second end, the first end being coupled to the first car or to the car frame and the second end being coupled to the second car, wherein the second car exerts a pressure load on the force absorption section due to gravity;

a drive device coupled to the push chain, the drive device displacing the second car in the vertical direction relative to the first car through the push chain; and wherein the drive device has a motor that is driven as a generator by the push chain when the second car is displaced by gravity.

* * * * *